United States Patent
Ding et al.

(10) Patent No.: US 10,044,291 B2
(45) Date of Patent: Aug. 7, 2018

(54) METHOD AND DEVICE FOR MODULATING A FIVE-LEVEL INVERTER, AND PHOTOVOLTAIC SYSTEM

(71) Applicant: Sungrow Power Supply Co., Ltd., Hefei, Anhui (CN)

(72) Inventors: Jie Ding, Anhui (CN); Haiyan Zou, Anhui (CN); Lei Tao, Anhui (CN); Taotao Xu, Anhui (CN); Cheng Zhang, Anhui (CN)

(73) Assignee: SUNGROW POWER SUPPLY CO., LTD., Anhui (CN)

( * ) Notice: Subject to any disclaimer, the term of this patent is extended or adjusted under 35 U.S.C. 154(b) by 233 days.

(21) Appl. No.: 14/938,192

(22) Filed: Nov. 11, 2015

(65) Prior Publication Data

US 2016/0181945 A1 Jun. 23, 2016

(30) Foreign Application Priority Data

Dec. 18, 2014 (CN) .......................... 2014 1 0802612

(51) Int. Cl.
*H02M 7/42* (2006.01)
*H02J 3/38* (2006.01)
(Continued)

(52) U.S. Cl.
CPC .............. *H02M 7/42* (2013.01); *H02J 3/383* (2013.01); *H02M 1/00* (2013.01); *H02M 7/487* (2013.01);
(Continued)

(58) Field of Classification Search
CPC ...... H02M 7/42; H02M 7/5395; H02M 7/487; H02M 1/00; H02M 1/12; H02M 3/00; H02J 3/383; Y02E 10/56
See application file for complete search history.

(56) References Cited

U.S. PATENT DOCUMENTS 8,031,495 B2 * 10/2011 Sachdeva ................ H02M 7/49
363/132
9,325,252 B2 * 4/2016 Narimani ............ H02M 5/4585
(Continued)

FOREIGN PATENT DOCUMENTS

CN 101860248 A 10/2010
CN 103368433 A 10/2013
(Continued)

OTHER PUBLICATIONS

Japanese Notification of Reasons for Rejection corresponding to Application No. 2015-226897; dated Dec. 13, 2016, with English translation.

(Continued)

*Primary Examiner* — Jared Fureman
*Assistant Examiner* — Emmanuel R Dominique
(74) *Attorney, Agent, or Firm* — Cantor Colburn LLP

(57) ABSTRACT

A method and device for modulating a five-level inverter, and a photovoltaic system are provided. The method includes: acquiring a voltage command value Vcmd of a phase bridge; controlling a first and a fourth switching devices to be switched on alternately when Vcmd≥V1Pos+Vthrs1; controlling the first and a third switching devices to be switched on alternately when V1Pos−Vthrs2≤Vcmd<V1Pos+Vthrs1; controlling the fourth and the third switching devices to be switched on alternately when 0≤Vcmd<V1Pos−Vthrs2; controlling the third and a fifth switching devices to be switched on alternately when −V1Neg+Vthrs3≤Vcmd<0; controlling the third and a second switching devices to be switched on alternately when −V1Neg−Vthrs4≤Vcmd<−V1Neg+Vthrs3; controlling the fifth and the second switching devices to be switched on alternately when Vcmd<−V1Neg−Vthrs4.

10 Claims, 6 Drawing Sheets

(51) Int. Cl.
    *H02M 1/00*     (2006.01)
    *H02M 7/487*     (2007.01)
    *H02M 7/5395*     (2006.01)
    *H02M 1/12*     (2006.01)
    *H02M 3/00*     (2006.01)

(52) U.S. Cl.
    CPC ............ *H02M 7/5395* (2013.01); *H02M 1/12* (2013.01); *H02M 3/00* (2013.01); *Y02E 10/56* (2013.01)

(56) References Cited

U.S. PATENT DOCUMENTS

| | | | |
|---|---|---|---|
| 2012/0218795 A1* | 8/2012 | Mihalache | H02M 7/487 363/97 |
| 2013/0033912 A1 | 2/2013 | Wu et al. | |
| 2013/0200715 A1* | 8/2013 | Pettersson | H02M 7/537 307/82 |
| 2013/0301314 A1* | 11/2013 | Fu | H02M 7/487 363/37 |
| 2014/0268967 A1 | 9/2014 | White et al. | |
| 2014/0307489 A1 | 10/2014 | Kidera et al. | |
| 2014/0319919 A1* | 10/2014 | Fu | H02M 7/539 307/82 |

FOREIGN PATENT DOCUMENTS

| | | |
|---|---|---|
| CN | 103457502 A | 12/2013 |
| DE | 202010012993 U1 | 2/2012 |
| DE | 102013005277 B3 | 7/2014 |
| EP | 2251969 A1 | 11/2010 |
| EP | 2787628 A1 | 10/2014 |
| JP | 2012070498 A | 4/2012 |
| JP | 2012253981 A | 12/2012 |
| WO | 2012069646 A1 | 5/2012 |
| WO | 2013080465 A1 | 6/2013 |

OTHER PUBLICATIONS

Bo Baozhong et al., "Study of the Narrow Pulse Compensation Technique of Five-level Inverters", Electric Drive, Year 2005, Issue 6, p. 22-25.

Chinese First Office Action corresponding to Application No. 201410802612.2; dated May 24, 2016, with English summary.

Extended European Search Report corresponding to Application No. 15193963.4-1809/3035510; dated Jul. 5, 2016.

River T.H. Li et al., Use of Hybrid and Passive Resonant Snubber for a Grid-Connected CSI; IEEE Transactions on Power Electronics, vol. 25, No. 2, Feb. 2010, pp. 298-309.

* cited by examiner

METHOD AND DEVICE FOR MODULATING A FIVE-LEVEL INVERTER, AND PHOTOVOLTAIC SYSTEM

CROSS REFERENCE OF RELATED APPLICATION

The present invention claims priority under 35 U.S.C. § 119 to Chinese Application No. 201410802612.2 filed Dec. 18, 2014, the entire content of which is incorporated herein by reference.

FIELD

The present disclosure relates to the technical field of photovoltaic power generation, and in particular to a method for modulating a five-level inverter, a device for modulating a five-level inverter, and a photovoltaic system.

BACKGROUND

As shown in FIG. 1, a direct current side of a five-level inverter 10 is connected to a photovoltaic array 20 and configured to receive a PV input voltage at the direct current side. The PV input voltage is applied across a positive electrode of a capacitor C1 and a negative electrode of a capacitor C2, voltages of C1 and C2 relative to a middle point of DC-bus are V1Pos and V1Neg respectively. And the PV input voltage is step up by two Boost circuits at the front of the five-level inverter 10, then is applied across a positive electrode of a bus capacitor C3 and a negative electrode of a bus capacitor C4, and voltages of C3 and C4 relative to the middle point of the DC-bus are V2Pos and V2Neg respectively. An output voltage from the grid side of the five-level inverter 10 is filtered by a filter 30, step up by a transformer 40 and then transmitted to a power grid. In different combinations of switching states of switching devices, the five-level inverter 10 alternately outputs levels +V1Pos, −V1Neg, +V2Pos, −V2Neg and a zero level corresponding to the middle point of the DC-bus.

In the conventional carrier based modulation method, based on the relationship between the voltage command value Vcmd of each phase bridge of the five-level inverter and the output voltage level, the modulation may include four modulation sections:

1) a first modulation section: in a case that Vcmd≥V1Pos, a switching device S2Pos and a switching device S1Pos are switched on alternately, and the output voltage level is switched between +V2Pos and +V1Pos;

2) a second modulation section: in a case that 0≤Vcmd<V1Pos, the switching device S1Pos and a switching device S0 are switched on alternately, and the output voltage level is switched between +V1Pos and 0;

3) a third modulation section: in a case that −V1Neg≤Vcmd<0, the switching device S0 and a switching device S1Neg are switched on alternately, and the output voltage level is switched between 0 and −V1Neg; and 4) a fourth modulation section: in a case that Vcmd<−V1Neg, the switching device S1Neg and a switching device S2Neg are switched on alternately, and the output voltage level is switched between −V1Neg and −V2Neg.

However, in a case that V1Pos−Vx<Vcmd<V1Pos, a corresponding duty ratio command value Dcmd meets 1−Vx/V1Pos<Dcmd<1; in a case that Vcmd is greater than 0 and approaches V1Pos from a value less than V1Pos, Dcmd is close to 1, thereby resulting in many narrow pulses; and in a case that Vx/V1Pos is less than the duty ratio Dthrs corresponding to the sum of narrow pulse time and dead-band time, in order to ensure that switching devices operate safely, these narrow pulses need to be deleted and Dcmd is clamped to 1. Similarly, in a case that Vcmd is greater than 0 and approaches +V1Pos from a value greater than +V1Pos, Vcmd is less than 0 and approaches −V1Neg from a value greater than −V1Neg, Vcmd is less than 0 and approaches −V1Neg from a value less than −V1Neg, or Vcmd approaches 0, there are also many narrow pulses to be deleted. However, deleting of narrow pulses results in distortion of the phase bridge output voltage.

SUMMARY

In view of above, a method for modulating a five-level inverter, a device for modulating a five-level inverter, and a photovoltaic system are provided according to the present disclosure, to reduce the number of narrow pulses generated during modulating of the five-level inverter, thereby reducing the impact on the distortion of the phase bridge output voltage of the five-level inverter due to deleting of the narrow pulses, and the safety operation of the switching devices is guaranteed at the same time.

A method for modulating a five-level inverter is provided, which includes:

acquiring a voltage command value Vcmd of a phase bridge of the five-level inverter;

controlling a first switching device and a fourth switching device to be switched on alternately in a case that Vcmd≥V1Pos+Vthrs1;

controlling the first switching device and a third switching device to be switched on alternately in a case that V1Pos−Vthrs2≤Vcmd<V1Pos+Vthrs1;

controlling the fourth switching device and the third switching device to be switched on alternately in a case that 0≤Vcmd<V1Pos−Vthrs2;

controlling the third switching device and a fifth switching device to be switched on alternately in a case that −V1Neg+Vthrs3≤Vcmd<0;

controlling the third switching device and a second switching device to be switched on alternately in a case that −V1Neg−Vthrs4≤Vcmd<−V1Neg+Vthrs3; and controlling the fifth switching device and the second switching device to be switched on alternately in a case that Vcmd<−V1Neg−Vthrs4, where Vthrs1≥Dthrs*(V2Pos−V1Pos), Vthrs2≥Dthrs*V1Pos, Vthrs3≥Dthrs*V1Neg, and Vthrs4≥Dthrs*(V2Neg−V1Neg); and Dthrs indicates the duty ratio corresponding to the sum of narrow pulse time and dead-band time of the five-level inverter; and the five-level inverter alternately outputs five voltage levels +1, −1, +2, −2 and 0 in different combinations of switching states of the switching devices, and values of the five voltage levels are +V1Pos, −V1Neg, +V2Pos, −V2Neg and 0 respectively; the level +1 is outputted when the fourth switching device is switched on; the level −1 is outputted when the fifth switching device is switched on; the level +2 is outputted when the first switching device is switched on; the level −2 is outputted when the second switching device is switched on; and the level 0 is outputted when the third switching device is switched on.

Specifically, Vthrs1=Dthrs*(V2Pos−V1Pos), Vthrs2=Dthrs*V1Pos, Vthrs3=Dthrs*V1Neg and Vthrs4=Dthrs*(V2Neg−V1Neg).

A method for modulating a five-level inverter is provided, which includes:

acquiring a voltage command value Vcmd of a phase bridge of the five-level inverter;

controlling the first switching device and the fourth switching device to be switched on alternately in a case that Vcmd≥V1Pos+Vthrs1;

controlling the first switching device and a third switching device to be switched on alternately in a case that V1Pos−Vthrs2≤Vcmd<V1Pos+Vthrs1;

controlling the fourth switching device and the third switching device to be switched on alternately in a case that Vthrs5≤Vcmd<V1Pos−Vthrs2;

controlling the fourth switching device and a fifth switching device to be switched on alternately in a case that −Vthrs6≤Vcmd<Vthrs5;

controlling the third switching device and the fifth switching device to be switched on alternately in a case that −V1Neg+Vthrs3≤Vcmd<−Vthrs6;

controlling the third switching device and a second switching device to be switched on alternately in a case that −V1Neg−Vthrs4≤Vcmd<−V1Neg+Vthrs3; and controlling the fifth switching device and the second switching device to be switched on alternately in a case that Vcmd<−V1Neg−Vthrs4, where Vthrs1≥Dthrs*(V2Pos−V1Pos), Vthrs2≥Dthrs*V1Pos, Vthrs3≥Dthrs*V1Neg, Vthrs4≥Dthrs*(V2Neg−V1Neg), Vthrs5≥Dthrs*V1Pos and Vthrs6≥Dthrs*V1Neg; and Dthrs indicates a duty ratio corresponding to the sum of narrow pulse time and dead-band time of the five-level inverter; and the five-level inverter alternately outputs five voltage levels +1, −1, +2, −2 and 0 in different combinations of switching states of the switching devices, and values of the five voltage levels are +V1Pos, −V1Neg, +V2Pos, −V2Neg and 0 respectively; the level +1 is outputted when the fourth switching device is switched on; the level −1 is outputted when the fifth switching device is switched on; the level +2 is outputted when the first switching device is switched on; the level −2 is outputted when the second switching device is switched on; and the level 0 is outputted when the third switching device is switched on.

Specifically, Vthrs1=Dthrs*(V2Pos−V1Pos), Vthrs2=Dthrs*V1Pos, Vthrs3=Dthrs*V1Neg, Vthrs4=Dthrs*(V2Neg−V1Neg), Vthrs5=Dthrs*V1Pos and Vthrs6=Dthrs*V1Neg.

A device for modulating a five-level inverter is provided, which includes:

an acquiring unit configured to acquire a voltage command value Vcmd of a phase bridge of the five-level inverter;

a first processing unit configured to control a first switching device and a fourth switching device to be switched on alternately in a case that Vcmd≥V1Pos+Vthrs1;

a second processing unit configured to control the first switching device and a third switching device to be switched on alternately in a case that V1Pos−Vthrs2≤Vcmd<V1Pos+Vthrs1;

a third processing unit configured to control the fourth switching device and the third switching device to be switched on alternately in a case that 0≤Vcmd<V1Pos−Vthrs2;

a fourth processing unit configured to control the third switching device and a fifth switching device to be switched on alternately in a case that −V1Neg+Vthrs3≤Vcmd<0;

a fifth processing unit configured to control the third switching device and a second switching device to be switched on alternately in a case that −V1Neg−Vthrs4≤Vcmd<−V1Neg+Vthrs3; and a sixth processing unit configured to control the fifth switching device and the second switching device to be switched on alternately in a case that Vcmd<−V1Neg−Vthrs4, where Vthrs1≥Dthrs*(V2Pos−V1Pos), Vthrs2≥Dthrs*V1Pos, Vthrs3≥Dthrs*V1Neg and Vthrs4≥Dthrs*(V2Neg−V1Neg); and Dthrs indicates a duty ratio corresponding to the sum of narrow pulse time and dead-band time of the five-level inverter; and the five-level inverter alternately outputs five voltage levels +1, −1, +2, −2 and 0 in different combinations of switching states of the switching devices, and values of the five voltage levels are +V1Pos, −V1Neg, +V2Pos, −V2Neg and 0 respectively; the level +1 is outputted when the fourth switching device is switched on; the level −1 is outputted when the fifth switching device is switched on; the level +2 is outputted when the first switching device is switched on; the level −2 is outputted when the second switching device is switched on; and the level 0 is outputted when the third switching device is switched on.

Specifically, Vthrs1=Dthrs*(V2Pos−V1Pos), Vthrs2=Dthrs*V1Pos, Vthrs3=Dthrs*V1Neg and Vthrs4=Dthrs*(V2Neg−V1Neg).

A device for modulating a five-level inverter is provided, which includes:

an acquiring unit configured to acquire a voltage command value Vcmd of a phase bridge of the five-level inverter;

a first processing unit configured to control a first switching device and a fourth switching device to be switched on alternately in a case that Vcmd≥V1Pos+Vthrs1;

a second processing unit configured to control the first switching device and a third switching device to be switched on alternately in a case that V1Pos−Vthrs2≤Vcmd<V1Pos+Vthrs1;

a third processing unit configured to control the fourth switching device and the third switching device to be switched on alternately in a case that Vthrs5≤Vcmd<V1Pos−Vthrs2;

a fourth processing unit configured to control the fourth switching device and a fifth switching device to be switched on alternately in a case that −Vthrs6≤Vcmd<Vthrs5;

a fifth processing unit configured to control the third switching device and the fifth switching device to be switched on alternately in a case that −V1Neg+Vthrs3≤Vcmd<−Vthrs6;

a sixth processing unit configured to control the third switching device and a second switching device to be switched on alternately in a case that −V1Neg−Vthrs4≤Vcmd<−V1Neg+Vthrs3; and a seventh processing unit configured to control the fifth switching device and the second switching device to be switched on alternately in a case that Vcmd<−V1Neg−Vthrs4, where Vthrs1≥Dthrs*(V2Pos−V1Pos), Vthrs2≥Dthrs*V1Pos, Vthrs3≥Dthrs*V1Neg, Vthrs4≥Dthrs*(V2Neg−V1Neg), Vthrs5≥Dthrs*V1Pos and Vthrs6≥Dthrs*V1Neg; and Dthrs indicates a duty ratio corresponding to the sum of narrow pulse time and dead-band time of the five-level inverter; and the five-level inverter alternately outputs five voltage levels +1, −1, +2, −2 and 0 in different combinations of switching states of the switching devices, and values of the five voltage levels are +V1Pos, −V1Neg, +V2Pos, −V2Neg and 0 respectively; the level +1 is outputted when the fourth switching device is switched on; the level −1 is outputted when the fifth switching device is switched on; the level +2 is outputted when the first switching device is switched on; the level −2 is outputted when the second switching device is switched on; and the level 0 is outputted when the third switching device is switched on.

Specifically, Vthrs1=Dthrs*(V2Pos−V1Pos), Vthrs2=Dthrs*V1Pos, Vthrs3=Dthrs*V1Neg, Vthrs4=Dthrs*(V2Neg−V1Neg), Vthrs5=Dthrs*V1Pos and Vthrs6=Dthrs*V1Neg.

A photovoltaic system is provided, which includes a photovoltaic array, two Boost circuits, a five-level inverter, a filter and a transformer, where a direct current side of the five-level inverter is connected to the photovoltaic array, and the grid side of the five-level inverter is connected to the power grid via the filter and the transformer; and the photovoltaic system further includes a controller connected to the five-level inverter, and the controller is configured to: acquire a voltage command value Vcmd of the phase bridge of the five-level inverter; control a first switching device and a fourth switching device to be switched on alternately in a case that Vcmd≥V1Pos+Vthrs1; control the first switching device and a third switching device to be switched on alternately in a case that V1Pos−Vthrs2≤Vcmd<V1Pos+Vthrs1; control the fourth switching device and the third switching device to be switched on alternately in a case that 0≤Vcmd<V1Pos−Vthrs2; control the third switching device and a fifth switching device to be switched on alternately in a case that −V1Neg+Vthrs3≤Vcmd<0; control the third switching device and a second switching device to be switched on alternately in a case that −V1Neg−Vthrs4≤Vcmd<−V1Neg+Vthrs3; and control the fifth switching device and the second switching device to be switched on alternately in a case that Vcmd<−V1Neg−Vthrs4;

Vthrs1≥Dthrs*(V2Pos−V1Pos), Vthrs2≥Dthrs*V1Pos, Vthrs3≥Dthrs*V1Neg and Vthrs4≥Dthrs*(V2Neg−V1Neg); and Dthrs indicates a duty ratio corresponding to the sum of narrow pulse time and dead-band time of the five-level inverter; and the five-level inverter alternately outputs five voltage levels +1, −1, +2, −2 and 0 in different combinations of switching states of the switching devices, and values of the five voltage levels are +V1Pos, −V1Neg, +V2Pos, −V2Neg and 0 respectively; the level +1 is outputted when the fourth switching device is switched on; the level −1 is outputted when the fifth switching device is switched on; the level +2 is outputted when the first switching device is switched on; the level −2 is outputted when the second switching device is switched on; and the level 0 is outputted when the third switching device is switched on.

A photovoltaic system is provided, which includes a photovoltaic array, two Boost circuits, a five-level inverter, a filter and a transformer, where a direct current side of the five-level inverter is connected to the photovoltaic array via the two Boost circuits, and a grid side of the five-level inverter is connected to a power grid via the filter and the transformer; and the photovoltaic system further includes a controller connected to the five-level inverter, and the controller is configured to: acquire a voltage command value Vcmd of a phase bridge of the five-level inverter; control a first switching device and a fourth switching device to be switched on alternately in a case that Vcmd≥V1Pos+Vthrs1; control the first switching device and a third switching device to be switched on alternately in a case that V1Pos−Vthrs2≤Vcmd<V1Pos+Vthrs1; control the fourth switching device and the third switching device to be switched on alternately in a case that Vthrs5≤Vcmd<V1Pos−Vthrs2; control the fourth switching device and a fifth switching device to be switched on alternately in a case that −Vthrs6≤Vcmd<Vthrs5; control the third switching device and the fifth switching device to be switched on alternately in a case that −V1Neg+Vthrs3≤Vcmd<−Vthrs6; control the third switching device and a second switching device to be switched on alternately in a case that −V1Neg−Vthrs4≤Vcmd<−V1Neg+Vthrs3; and control the fifth switching device and the second switching device to be switched on alternately in a case that Vcmd<−V1Neg−Vthrs4;

Vthrs1≥Dthrs*(V2Pos−V1Pos), Vthrs2≥Dthrs*V1Pos, Vthrs3≥Dthrs*V1Neg, Vthrs4≥Dthrs*(V2Neg−V1Neg), Vthrs5≥Dthrs*V1Pos and Vthrs6≥Dthrs*V1Neg; and Dthrs indicates a duty ratio corresponding to the sum of narrow pulse time and dead-band time of the five-level inverter; and the five-level inverter alternately outputs five voltage levels +1, −1, +2, −2 and 0 in different combinations of switching states of the switching devices, and values of the five voltage levels are +V1Pos, −V1Neg, +V2Pos, −V2Neg and 0 respectively; the level +1 is outputted when the fourth switching device is switched on; the level −1 is outputted when the fifth switching device is switched on; the level +2 is outputted when the first switching device is switched on; the level −2 is outputted when the second switching device is switched on; and the level 0 is outputted when the third switching device is switched on.

According to the above technical solutions, in a case that Vcmd approaches the output voltage level +V1Pos or −V1Neg, the output voltage level of the five-level inverter is switched cross levels according to the present disclosure rather than between adjacent levels, such that the duty ratio is far away from 0 or 1 rather than approaching 0 or 1, thereby preventing generating narrow pulses in a case that Vcmd approaches +V1Pos or −V1Neg. In the conventional technology, the narrow pulses are generated in a case that Vcmd approaches +V1Pos, −V1Neg or 0; and according to the present disclosure, the number of the narrow pulses generated during modulating of the five-level inverter is reduced significantly, thereby reducing the impact on the distortion of the phase bridge output voltage of the five-level inverter due to deleting of the narrow pulses, and the safety operation of the switching devices is guaranteed at the same time.

BRIEF DESCRIPTION OF THE DRAWINGS

In order to illustrate technical solutions in embodiments of the present disclosure or the conventional technology more clearly, hereinafter drawings to be used in the description of the embodiments or the conventional technology are introduced simply. Apparently, the drawings described below only describe the embodiments of the present disclosure. For those skilled in the art, other drawings may be obtained based on the provided drawings without any creative work.

DETAILED DESCRIPTION OF THE EMBODIMENTS

Hereinafter technical solutions of embodiments of the present disclosure are described clearly and completely in conjunction with the drawings of the embodiments of the present disclosure. Apparently, the described embodiments are only some of the embodiments of the present disclosure rather than all the embodiments. Any other embodiments obtained based on the embodiments of the present disclosure by those skilled in the art without any creative work fall within the protection scope of the present disclosure.

According to embodiments of the present disclosure, a method for modulating a five-level inverter is disclosed, to reduce the number of narrow pulses generated during modulating of the five-level inverter, thereby reducing the impact on the distortion of the phase bridge output voltage of the five-level inverter due to deleting of the narrow pulses, and the safety operation of the switching devices is guaranteed at the same time. For facilitating describing, following definitions are made firstly.

Figure 1:
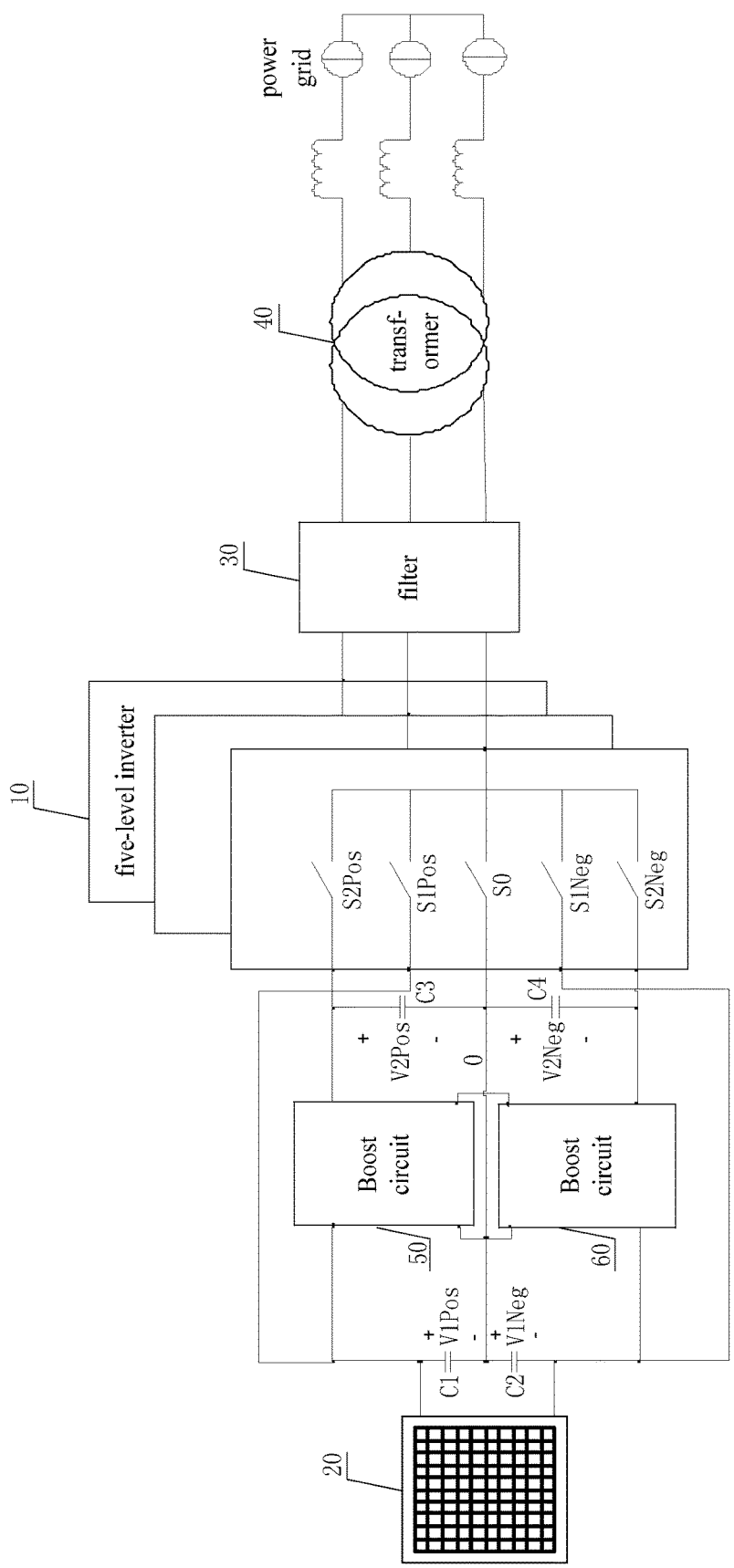
FIG. 1 is a schematic structural diagram of a photovoltaic system according to the conventional technology.

Referring to FIG. 1, a five-level inverter 10 alternately outputs five voltage levels +1, −1, +2, −2 and 0 in different combinations of switching states of switching devices, and values of the five voltage levels are +V1Pos, −V1Neg, +V2Pos, −V2Neg and 0 respectively. For facilitating describing, S2Pos indicates a first switching device, the level +2 is outputted when the first switching device is switched on; S2Neg indicates a second switching device, the level −2 is outputted when the second switching device is switched on; S0 indicates a third switching device, the level 0 is outputted when the third switching device is switched on; S1Pos indicates a fourth switching device, the level +1 is outputted when the fourth switching device is switched on; and S1Neg indicates a fifth switching device, the level −1 is outputted when the fifth switching device is switched on. Dthrs indicates a duty ratio corresponding to the sum of narrow pulse time and dead-band time of the five-level inverter 10, which is a known constant.

Figure 2:
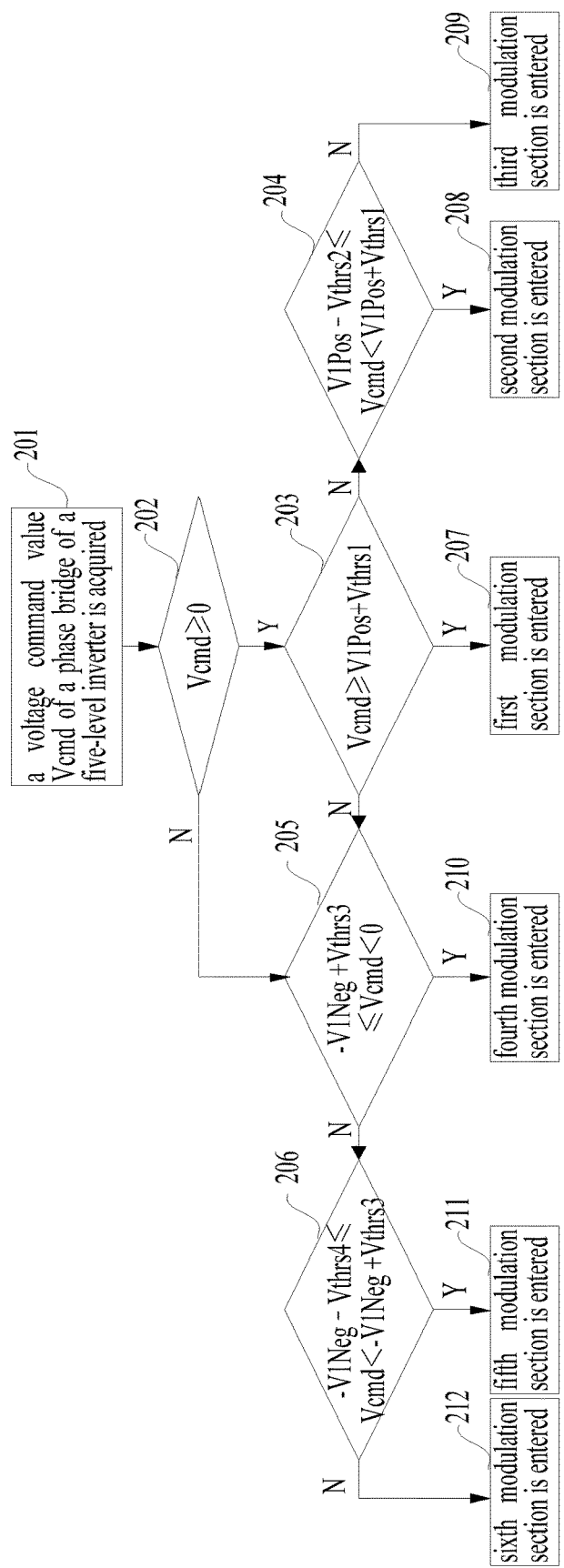
FIG. 2 is a flowchart of a method for modulating a five-level inverter according to an embodiment of the present disclosure.

In conjunction with the above definitions, as shown in FIG. 2, the method for modulating a five-level inverter may include step S201 to step S212 hereinafter.

In step S201, a voltage command value Vcmd of a phase bridge of the five-level inverter is acquired.

In step 202, it is determined whether Vcmd≥0 is met; and if Vcmd≥0 is met, the method proceeds to step S203; otherwise, the method proceeds to step S205.

In step S203, it is determined whether Vcmd≥V1Pos+Vthrs1 is met; and if Vcmd≥V1Pos+Vthrs1 is met, the method proceeds to step S207; otherwise, the method proceeds to step S204, where Vthrs1≥Dthrs*(V2Pos−V1Pos).

In step S204, it is determined whether V1Pos−Vthrs2≤Vcmd<V1Pos+Vthrs1 is met; if V1Pos−Vthrs2≤Vcmd<V1Pos+Vthrs1 is met, the method proceeds to step 208; otherwise the method proceeds to step 209, where Vthrs2≥Dthrs*V1Pos.

In step S205, it is determined whether −V1Neg+Vthrs3≤Vcmd<0 is met; and if −V1Neg+Vthrs3≤Vcmd<0 is met, the method proceeds to step 210; otherwise, the method proceeds to step 206, where Vthrs3≥Dthrs*V1Neg.

In step 206, it is determined whether −V1Neg−Vthrs4≤Vcmd<−V1Neg+Vthrs3 is met; and if −V1Neg−Vthrs4≤Vcmd<−V1Neg+Vthrs3 is met, the method proceeds to step 211; otherwise, the method proceeds to step 212, where Vthrs4≥Dthrs*(V2Neg−V1Neg).

In step 207, a first modulation section is entered, in which the switching device S2Pos and the switching device S1Pos are controlled to be switched on alternately, and an output voltage level is switched between +V2Pos and +V1Pos.

In step 208, a second modulation section is entered, in which the switching device S2Pos and the switching device S0 are controlled to be switched on alternately, and the output voltage level is switched between +V2Pos and 0.

In step 209, a third modulation section is entered, in which the switching device S1Pos and the switching device S0 are controlled to be switched on alternately, and the output voltage level is switched between +V1Pos and 0.

In step 210, a fourth modulation section is entered, in which the switching device S0 and the switching device S1Neg are controlled to be switched on alternately, and the output voltage level is switched between 0 and −V1Neg.

In step 211, a fifth modulation section is entered, in which the switching device S0 and the switching device S2Neg are controlled to be switched on alternately, and the output voltage level is switched between 0 and −V2Neg.

In step 212, a sixth modulation section is entered, in which the switching device S1Neg and the switching device S2Neg are controlled to be switched on alternately, and the output voltage level is switched between −V1Neg and −V2Neg.

Since a duty ratio is a ratio of the switch-on time of one of the two output voltage levels in each modulation section in a switching period to the whole switching period, duty ratio command values Dcmd for different modulation sections may be calculated based on the voltage command value Vcmd of each phase bridge (Vthrs1, Vthrs2, Vthrs3 and Vthrs4 are voltage thresholds for adjusting the modulation sections).

1) In the first modulation section, Dcmd=(Vcmd−V1Pos)/(V2Pos−V1Pos); and since Vcmd≥V1Pos+Vthrs1 is met in the first modulation section, Dcmd≥Vthrs1/(V2Pos−V1Pos).

In a case that Vcmd approaches +V1Pos, in order to prevent generating narrow pulses while the duty ratio approaches 0 in the first modulation section, Dcmd≥Vthrs1/(V2Pos−V1Pos)≥Dthrs needs to be met, and in this case Vthrs1≥Dthrs*(V2Pos−V1Pos).

2) In the second modulation section, Dcmd=Vcmd/V2Pos, and since V1Pos−Vthrs2≤Vcmd<V1Pos+Vthrs1 is met in the second modulation section, (V1Pos−Vthrs2)/V2Pos≤Dcmd<(V1Pos+Vthrs1)/V2Pos.

In a normal operation case, in a case that Vcmd approaches +V1Pos, Dcmd is far away from 0 or 1, thereby preventing generating narrow pulses while the duty ratio approaches 0 or 1 in the second modulation section.

3) In the third modulation section, Dcmd=Vcmd/V1Pos, and since 0≤Vcmd<V1Pos−Vthrs2 is met in the third modulation section, 0≤Dcmd<1−Vthrs2/V1Pos.

In a case that Vcmd approaches +V1Pos, in order to prevent generating narrow pulses while the duty ratio approaches 1 in the third modulation section, Dcmd<1−Vthrs2/V1Pos≤1−Dthrs needs to be met, and in this case Vthrs2≥Dthrs*V1Pos.

4) In the fourth modulation section, Dcmd=−Vcmd/V1Neg, and since −V1Neg+Vthrs3≤Vcmd<0 is met in the fourth modulation section, 0<Dcmd≤1−Vthrs3/V1Neg.

In a case that Vcmd approaches −V1Neg, in order to prevent generating narrow pulses while the duty ratio approaches 1 in the fourth modulation section, Dcmd≤1−Vthrs3/V1Neg≤1−Dthrs needs to be met, and in this case Vthrs3≥Dthrs*V1Neg.

In the fifth modulation section, Dcmd=Vcmd/(−V2Neg), and since −V1Neg−Vthrs4≤Vcmd<−V1Neg+Vthrs3, (V1Neg−Vthrs3)/V2Neg<Dcmd≤(V1Neg+Vthrs4)/V2Neg.

In a normal operation case, in a case that Vcmd approaches −V1Neg, Dcmd is far away from 0 or 1, thereby preventing generating narrow pulses while the duty ratio approaches 0 or 1 in the fifth modulation section.

6) In the sixth modulation section, Dcmd=(Vcmd+V1Neg)/(−V2Neg+V1Neg), and since Vcmd<−V1Neg−Vthrs4 is met in the sixth modulation section, Dcmd>Vthrs4/(V2Neg−V1Neg).

In a case that Vcmd approaches −V1Neg, in order to prevent generating narrow pulses while the duty ratio approaches 0 in the sixth modulation section, Dcmd>Vthrs4/(V2Neg−V1Neg)≥Dthrs needs to be met, and in this case Vthrs4≥Dthrs*(V2Neg−V1Neg).

According to the above description, in the embodiment, in a case that Vcmd approaches the output voltage level +V1Pos or −V1Neg, the output voltage level of the five-level inverter is switched cross levels rather than between adjacent levels, such that the duty ratio is far way from 0 or 1 rather than approaching 0 or 1, thereby preventing generating narrow pulses in a case that Vcmd approaches +V1Pos or −V1Neg. In this case the narrow pulses are generated only in a case that Vcmd approaches 0, the number of the narrow pulses is reduced greatly, thereby reducing the impact on the distortion of the phase bridge output voltage of the five-level inverter due to deleting of the narrow pulses, and the safety operation of the switching devices is guaranteed at the same time.

In view of that the output voltage being switched cross levels may increase switching losses, hence time for cross levels operation is expected to be as short as possible, i.e., values of Vthrs1, Vthrs2, Vthrs3 and Vthrs4 should be as small as possible. Therefore, Vthrs1, Vthrs2, Vthrs3 and Vthrs4 are calculated as follows to reduce the switching losses: Vthrs1=Dthrs*(V2Pos−V1Pos), Vthrs2=Dthrs*V1Pos, Vthrs3=Dthrs*V1Neg and Vthrs4=Dthrs*(V2Neg−V1Neg).

Figure 3:
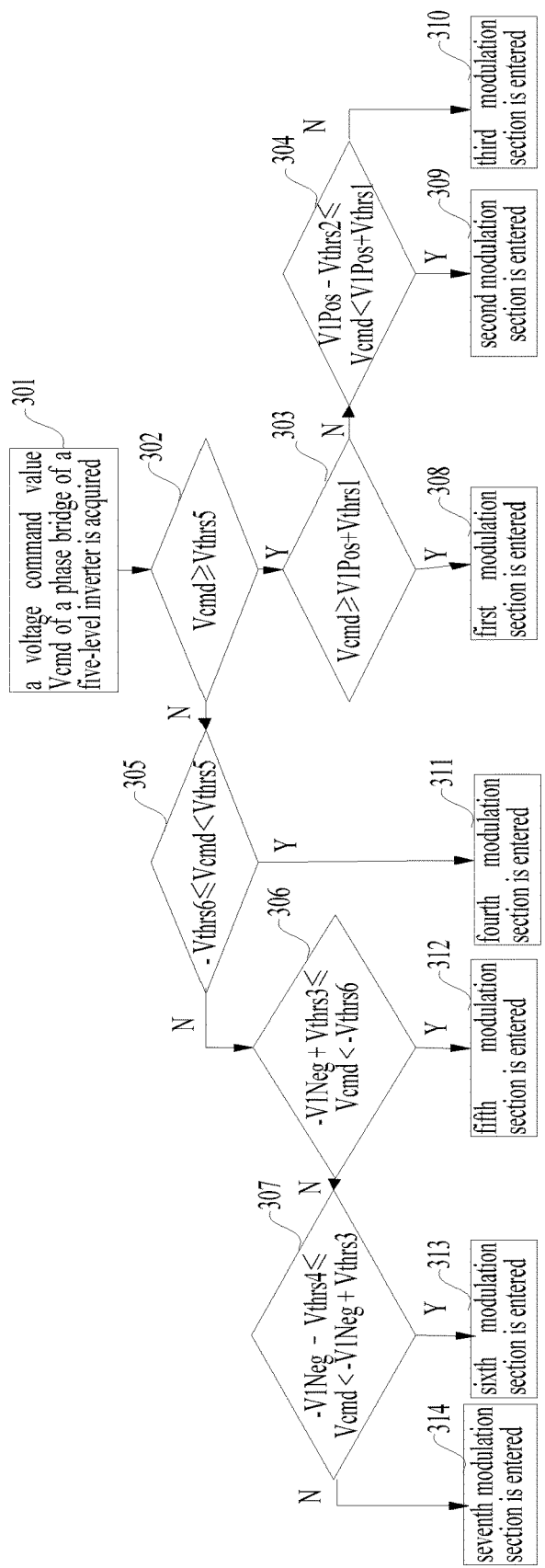
FIG. 3 is a flowchart of another method for modulating a five-level inverter according to an embodiment of the present disclosure.

In addition, referring to FIG. 3, another method for modulating a five-level inverter is disclosed according to an embodiment of the present disclosure. The method may include step 301 to step 314 hereinafter.

In step 301, a voltage command value Vcmd of a phase bridge of the five-level inverter is acquired.

In step 302, it is determined whether Vcmd≥Vthrs5 is met; and if Vcmd≥Vthrs5 is met, the method proceeds to step 303; otherwise, the method proceeds to step 305.

In step 303, it is determined whether Vcmd≥V1Pos+Vthrs1 is met; and if Vcmd≥V1Pos+Vthrs1 is met, the method proceeds to step 308; otherwise, the method proceeds to step 304.

In step 304, it is determined whether V1Pos−Vthrs2≤Vcmd<V1Pos+Vthrs1 is met; and if V1Pos−Vthrs2≤Vcmd<V1Pos+Vthrs1 is met, the method proceeds to step 309; otherwise, the method proceeds to step 310.

In step 305, it is determined whether −Vthrs6≤Vcmd<Vthrs5 is met; and if −Vthrs6≤Vcmd<Vthrs5 is met, the method proceeds to step 311; otherwise, the method proceeds to step 306.

In step 306, it is determined whether −V1Neg+Vthrs3≤Vcmd<−Vthrs6 is met; and if −V1Neg+Vthrs3≤Vcmd<−Vthrs6 is met, the method proceeds to step 312; otherwise, the method proceeds to step 307.

In step 307, it is determined whether −V1Neg−Vthrs4≤Vcmd<−V1Neg+Vthrs3 is met; and if −V1Neg−Vthrs4≤Vcmd<−V1Neg+Vthrs3 is met, the method proceeds to step 313; otherwise, the method proceeds to step 314.

In step 308, a first modulation section is entered, in which the switching device S2Pos and the switching device S1Pos are controlled to be switched on alternately, and an output voltage level is switched between +V2Pos and +V1Pos.

In step 309, a second modulation section is entered, in which the switching device S2Pos and the switching device S0 are controlled to be switched on alternately, and the output voltage level is switched between +V2Pos and 0.

In step 310, a third modulation section is entered, in which the switching device S1Pos and the switching device S0 are controlled to be switched on alternately, and the output voltage level is switched between +V1Pos and 0.

In step 311, a fourth modulation section is entered, in which the switching device S1Pos and the switching device S1Neg are controlled to be switched on alternately, and the output voltage level is switched between +V1Pos and −V1Neg.

In step 312, a fifth modulation section is entered, in which the switching device S0 and the switching device S1Neg are controlled to be switched on alternately, and the output voltage level is switched between 0 and −V1Neg.

In step 313, a sixth modulation section is entered, in which the switching device S0 and the switching device S2Neg are controlled to be switched on alternately, and the output voltage level is switched between 0 and −V2Neg.

In step 314, a seventh modulation section is entered, in which the switching device S1Neg and the switching device S2Neg are controlled to be switched on alternately, and the output voltage level is switched between −V1Neg and −V2Neg.

Similar to the above embodiment of the method for modulating a five-level inverter, since a duty ratio is a ratio of the switch-on time of one of the two output voltage levels in each modulation section in a switching period to the whole switching period, duty ratio command values Dcmd for different modulation sections may be calculated based on the voltage command value Vcmd of the phase bridge (Vthrs1, Vthrs2, Vthrs3, Vthrs4, Vthrs5 and Vthrs6 are voltage thresholds for adjusting the modulation sections).

1) In the first modulation section, Dcmd=(Vcmd−V1Pos)/(V2Pos−V1Pos), and since Vcmd≥V1Pos+Vthrs1 is met in the first modulation section, Dcmd≥Vthrs1/(V2Pos−V1Pos).

In a case that Vcmd approaches +V1Pos, in order to prevent generating narrow pulses while the duty ratio approaches 0 in the first modulation section, Dcmd≥Vthrs1/(V2Pos−V1Pos)≥Dthrs needs to be met, and in this case Vthrs1≥Dthrs*(V2Pos−V1Pos).

2) In the second modulation section, Dcmd=Vcmd/V2Pos, and since V1Pos−Vthrs2≤Vcmd<V1Pos+Vthrs1 is met in the second modulation section, (V1Pos−Vthrs2)/V2Pos≤Dcmd<(V1Pos+Vthrs1)/V2Pos.

In a normal operation case, in a case that Vcmd approaches +V1Pos, Dcmd is far away from 0 or 1, thereby preventing generating narrow pulses while the duty ratio approaches 0 or 1 in the second modulation section.

3) In the third modulation section, Dcmd=Vcmd/V1Pos, and since Vthrs5≤Vcmd<V1Pos−Vthrs2 is met in the third modulation section, Vthrs5/V1Pos≤Dcmd<1−Vthrs2/V1Pos.

In a case that Vcmd approaches +V1Pos, in order to prevent generating narrow pulses while the duty ratio approaches 1 in the third modulation section, $Dcmd<1-Vthrs2/V1Pos \leq 1-Dthrs$ needs to be met, and in this case $Vthrs2 \geq Dthrs*V1Pos$.

In a case that Vcmd approaches 0, in order to prevent generating narrow pulses while the duty ratio approaches 0 in the third modulation section, $Dcmd \geq Vthrs5/V1Pos \geq Dthrs$ needs to be met, and in this case $Vthrs5 \geq Dthrs*V1Pos$.

4) In the fourth modulation section, $Dcmd=(Vcmd+V1Neg)/(V1Pos+V1Neg)$, and since $-Vthrs6 \leq Vcmd < Vthrs5$ is met in the fourth modulation section, $(-Vthrs6+V1Neg)/(V1Pos+V1Neg) \leq Dcmd < (Vthrs5+V1Neg)/(V1Pos+V1Neg)$.

In a normal operation case, in a case that Vcmd approaches 0, Dcmd is far away from 0 or 1, thereby preventing generating narrow pulses while the duty ratio approaches 0 or 1 in the fourth modulation section.

5) In the fifth modulation section, $Dcmd=-Vcmd/V1Neg$, and since $-V1Neg+Vthrs3 \leq Vcmd < -Vthrs6$ is met in the fifth modulation section, $Vthrs6/V1Neg < Dcmd \leq 1-Vthrs3/V1Neg$.

In a case that Vcmd approaches −V1Neg, in order to prevent generating narrow pulses while the duty ratio approaches 1 in the fifth modulation section, $Dcmd \leq 1-Vthrs3/V1Neg \leq 1-Dthrs$ needs to be met, and in this case $Vthrs3 \geq Dthrs*V1Neg$.

In a case that Vcmd approaches 0, in order to prevent generating narrow pulses while the duty ratio approaches 0 in the fifth modulation section, $Dcmd > Vthrs6/V1Neg \geq Dthrs$ needs to be met, and in this case $Vthrs6 \geq Dthrs*V1Neg$.

6) In the sixth modulation section, $Dcmd=Vcmd/(-V2Neg)$, and since $-V1Neg-Vthrs4 \leq Vcmd < -V1Neg+Vthrs3$, $(V1Neg-Vthrs3)/V2Neg < Dcmd \leq (V1Neg+Vthrs4)/V2Neg$.

In a normal operation case, in a case that Vcmd approaches −V1Neg, Dcmd is far away from 0 or 1, thereby preventing generating narrow pulses while the duty ratio approaches 0 or 1 in the fifth modulation section.

7) In the seventh modulation section, $Dcmd=(Vcmd+V1Neg)/(-V2Neg+V1Neg)$, and since $Vcmd<-V1Neg-Vthrs4$ is met in the seventh modulation section, $Dcmd>Vthrs4/(V2Neg-V1Neg)$.

In a case that Vcmd approaches −V1Neg, in order to prevent generating narrow pulses while the duty ratio approaches 0 in the seventh modulation section, $Dcmd>Vthrs4/(V2Neg-V1Neg) \geq Dthrs$ needs to be met, and in this case $Vthrs4 \geq Dthrs*(V2Neg-V1Neg)$.

According to the above description, in the embodiment, in a case that Vcmd approaches the output voltage level +V1Pos, −V1Neg or 0, the output voltage level of the five-level inverter is switched cross levels rather than between adjacent levels, such that the duty ratio is far way from 0 or 1 rather than approaching 0 or 1, thereby preventing generating narrow pulses in a case that Vcmd approaches +V1Pos, −V1Neg or 0. As compared with the above embodiment of the method for modulating a five-level inverter, in the embodiment, the narrow pulses can be prevented from being generated both in a case that Vcmd approaches +V1Pos or −V1Neg and in a case that Vcmd approaches 0, thereby further reducing the impact on the distortion of the phase bridge output voltage of the five-level inverter due to deleting of the narrow pulses, and the safety operation of the switching devices is guaranteed at the same time.

Similarly, in view of that the output voltage level being switched cross levels may increase the switching losses, hence time for cross levels operation is expected to be as short as possible, i.e., values of Vthrs1 to Vthrs6 should be as small as possible. Therefore, Vthrs1 to Vthrs6 are calculated as follows to reduce the switching losses: $Vthrs1=Dthrs*(V2Pos-V1Pos)$, $Vthrs2=Dthrs*V1Pos$, $Vthrs3=Dthrs*V1Neg$, $Vthrs4=Dthrs*(V2Neg-V1Neg)$, $Vthrs5=Dthrs*V1Pos$ and $Vthrs6=Dthrs*V1Neg$.

Finally, it should be noted that, in the two method embodiments above, the modulation section to be entered is determined based on the value of Vcmd. The way for determining the modulation section to be entered based on Vcmd is not limited to the way disclosed above.

Figure 4:
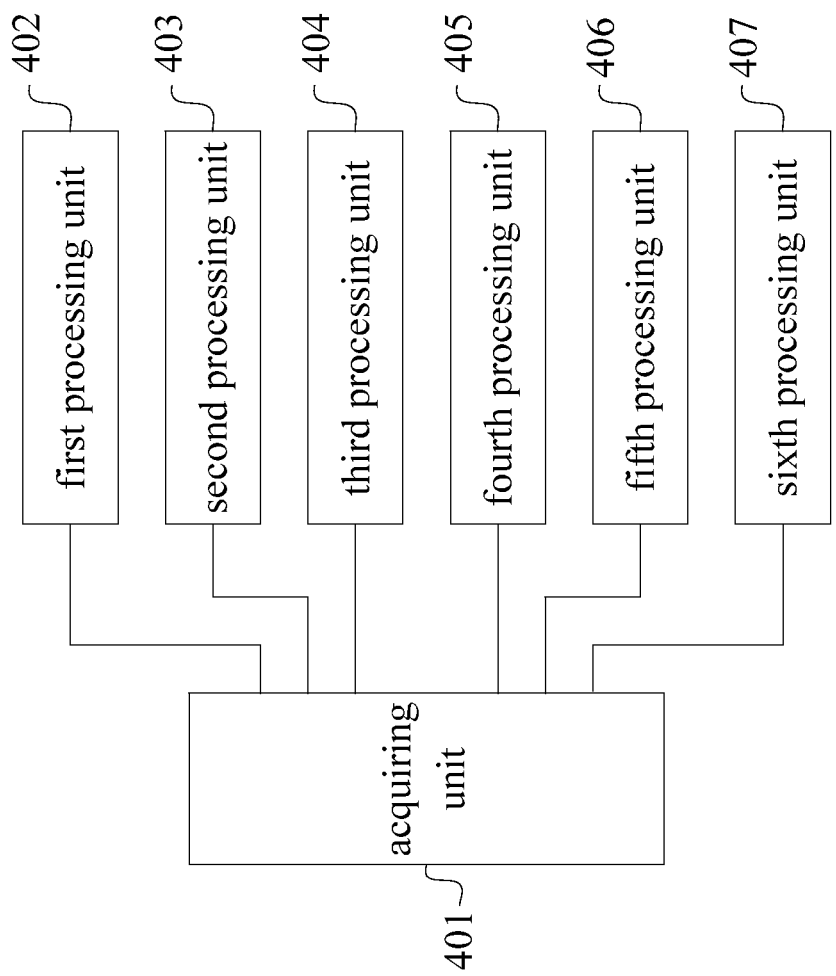
FIG. 4 is schematic structural diagram of a device for modulating a five-level inverter according to an embodiment of the present disclosure.

Referring to FIG. 4, a device for modulating a five-level inverter is further disclosed according to an embodiment of the present disclosure, to reduce the number of narrow pulses generated during modulating of the five-level inverter, thereby reducing the impact on the distortion of the phase bridge output voltage of the five-level inverter due to deleting of the narrow pulses, and the safety operation of the switching devices is guaranteed at the same time. The device includes an acquiring unit 401, a first processing unit 402, a second processing unit 403, a third processing unit 404, a fourth processing unit 405, a fifth processing unit 406 and a sixth processing unit 407.

The acquiring unit 401 is configured to acquire a voltage command value Vcmd of a phase bridge of the five-level inverter.

The first processing unit 402 is configured to control a switching device S2Pos and a switching device S1Pos to be switched on alternately in a case that $Vcmd \geq V1Pos+Vthrs1$.

The second processing unit 403 is configured to control the switching device S2Pos and a switching device S0 to be switched on alternately in a case that $V1Pos-Vthrs2 \leq Vcmd<V1Pos+Vthrs1$.

The third processing unit 404 is configured to control the switching device S1Pos and the switching device S0 to be switched on alternately in a case that $0 \leq Vcmd<V1Pos-Vthrs2$.

The fourth processing unit 405 is configured to control the switching device S0 and a switching device S1Neg to be switched on alternately in a case that $-V1Neg+Vthrs3 \leq Vcmd<0$.

The fifth processing unit 406 is configured to control the switching device S0 and a switching device S2Neg to be switched on alternately in a case that $-V1Neg-Vthrs4 \leq Vcmd<-V1Neg+Vthrs3$.

And the sixth processing unit 407 is configured to control the switching device S1Neg and the switching device S2Neg to be switched on alternately in a case that $Vcmd<-V1Neg-Vthrs4$.

Specifically, $Vthrs1 \geq Dthrs*(V2Pos-V1Pos)$, $Vthrs2 \geq Dthrs*V1Pos$, $Vthrs3 \geq Dthrs*V1Neg$ and $Vthrs4 \geq Dthrs*(V2Neg-V1Neg)$.

Preferably, Vthrs1 to Vthrs4 are calculated as follows: $Vthrs1=Dthrs*(V2Pos-V1Pos)$, $Vthrs2=Dthrs*V1Pos$, $Vthrs3=Dthrs*V1Neg$ and $Vthrs4=Dthrs*(V2Neg-V1Neg)$.

Figure 5:
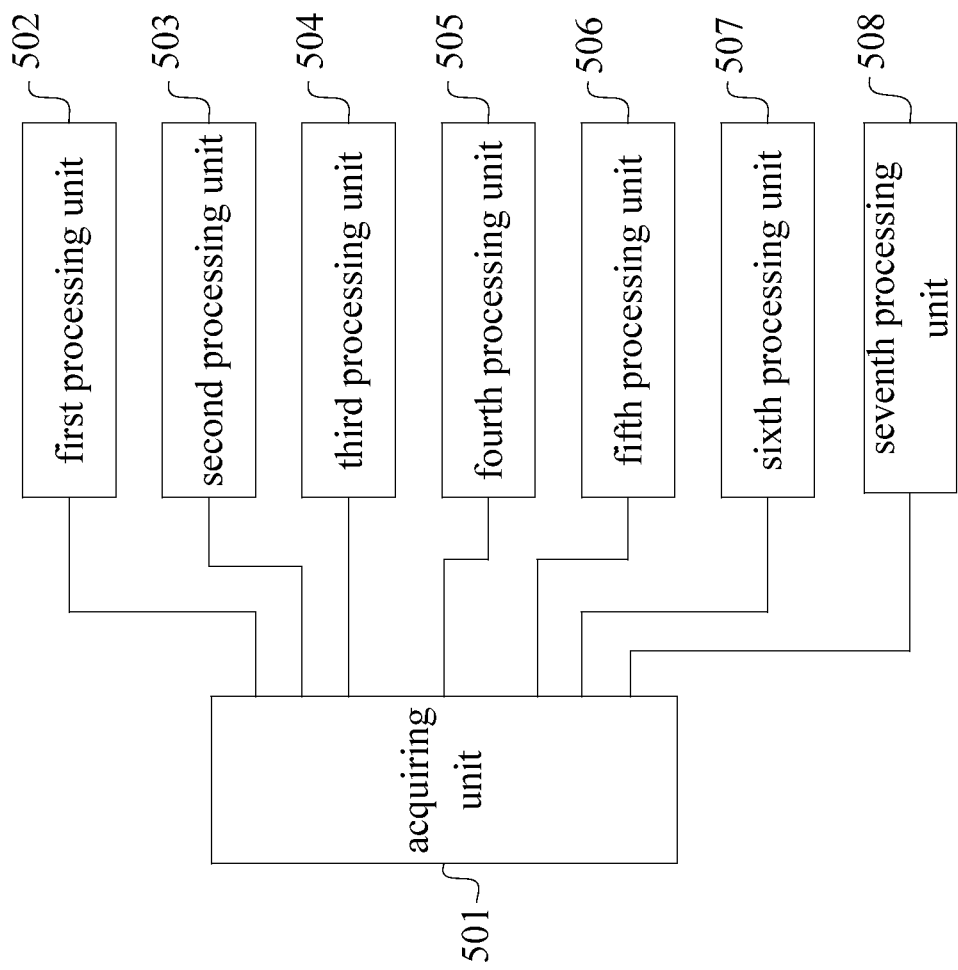
FIG. 5 is a schematic structural diagram of another device for modulating a five-level inverter according to an embodiment of the present disclosure.

Referring to FIG. 5, another device for modulating a five-level inverter is further disclosed according to an embodiment of the present disclosure. The device includes an acquiring unit 501, a first processing unit 502, a second processing unit 503, a third processing unit 504, a fourth processing unit 505, a fifth processing unit 506, a sixth processing unit 507 and a seventh processing unit 508.

The acquiring unit 501 is configured to acquire a voltage command value Vcmd of a phase bridge of the five-level inverter.

The first processing unit 502 is configured to control a switching device S2Pos and a switching device S1Pos to be switched on alternately in a case that Vcmd≥V1Pos+Vthrs1.

The second processing unit 503 is configured to control the switching device S2Pos and a switching device S0 to be switched on alternately in a case that V1Pos−Vthrs2≤Vcmd<V1Pos+Vthrs1.

The third processing unit 504 is configured to control the switching device S1Pos and the switching device S0 to be switched on alternately in a case that Vthrs5≤Vcmd<V1Pos−Vthrs2.

The fourth processing unit 505 is configured to control the switching device S1Pos and a switching device S1Neg to be switched on alternately in a case that −Vthrs6≤Vcmd<Vthrs5.

The fifth processing unit 506 is configured to control the switching device S0 and the switching device S1Neg to be switched on alternately in a case that −V1Neg+Vthrs3≤Vcmd<−Vthrs6.

The sixth processing unit 507 is configured to control the switching device S0 and a switching device S2Neg to be switched on alternately in a case that −V1Neg−Vthrs4≤Vcmd<−V1Neg+Vthrs3.

And the seventh processing unit 508 is configured to control the switching device S1Neg and the switching device S2Neg to be switched on alternately in a case that Vcmd<−V1Neg−Vthrs4.

Specifically, Vthrs1≥Dthrs*(V2Pos−V1Pos), Vthrs2≥Dthrs*V1Pos, Vthrs3≥Dthrs*V1Neg, Vthrs4≥Dthrs*(V2Neg−V1Neg), Vthrs5≥Dthrs*V1Pos and Vthrs6≥Dthrs*V1Neg.

Preferably, Vthrs1 to Vthrs6 are calculated as follows: Vthrs1=Dthrs*(V2Pos−V1Pos), Vthrs2=Dthrs*V1Pos, Vthrs3=Dthrs*V1Neg, Vthrs4=Dthrs*(V2Neg−V1Neg), Vthrs5=Dthrs*V1Pos and Vthrs6=Dthrs*V1Neg.

Figure 6:
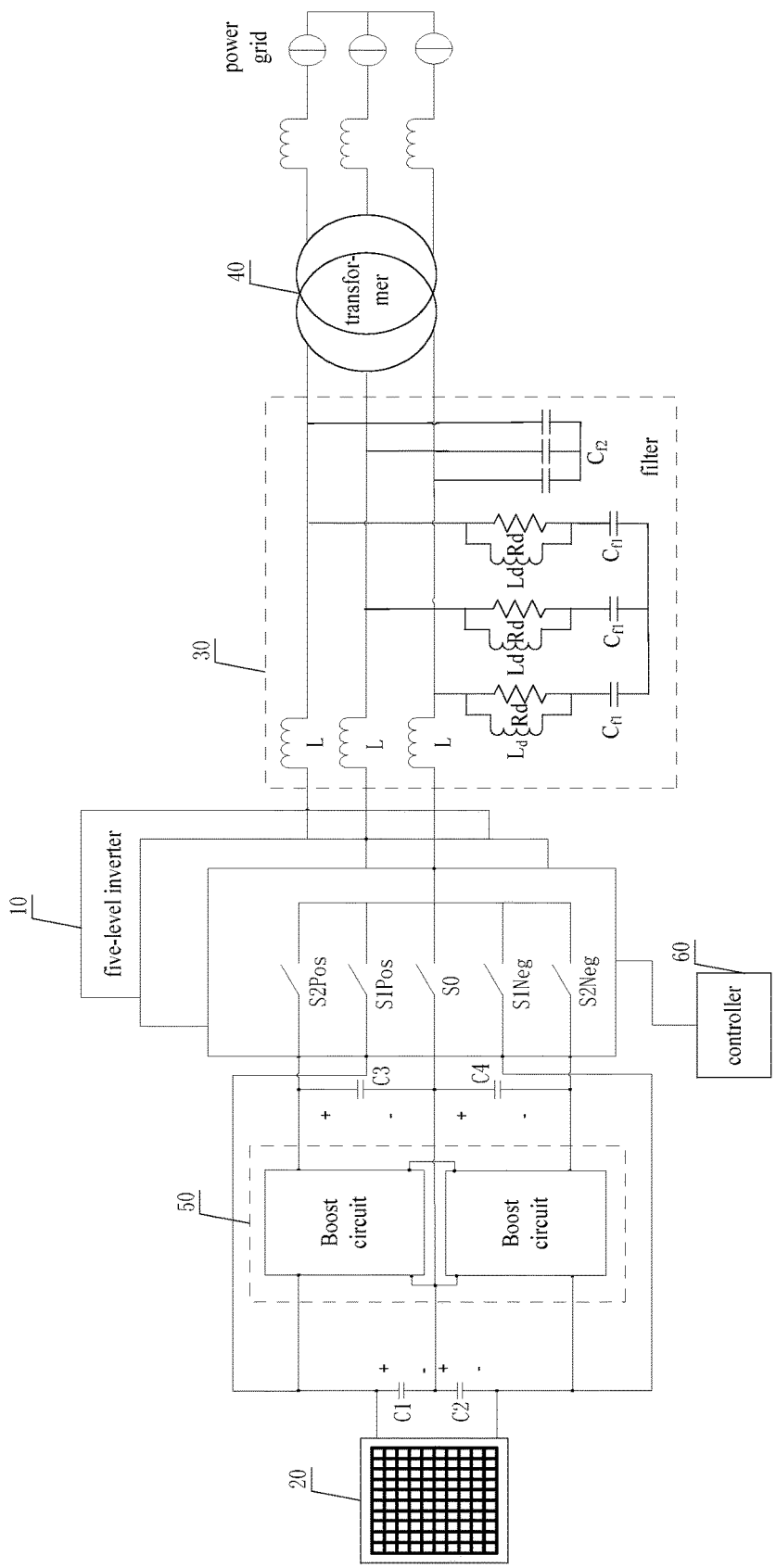
FIG. 6 is a schematic structural diagram of a photovoltaic system according to an embodiment of the present disclosure.

In addition, referring to FIG. 6, a photovoltaic system is further disclosed according to an embodiment of the present disclosure, to reduce the number of narrow pulses generated during modulating of a five-level inverter, thereby reducing the impact on the distortion of the phase bridge output voltage of the five-level inverter due to deleting of the narrow pulses, and the safety operation of the switching devices is guaranteed at the same time. The photovoltaic system includes a five-level inverter 10, a photovoltaic array 20, a filter 30, a transformer 40, two Boost circuits 50 and a controller 60.

A direct current side of the five-level inverter 10 is connected to the photovoltaic array 20 via the two Boost circuits 50, and a grid side of the five-level inverter 10 is connected to a power grid via the filter 30 and the transformer 40.

The controller 60 is connected to the five-level inverter 10 and configured to: acquire a voltage command value Vcmd of a phase bridge of the five-level inverter 10; control a switching device S2Pos and a switching device S1Pos to be switched on alternately in a case that Vcmd≥V1Pos+Vthrs1; control the switching device S2Pos and a switching device S0 to be switched on alternately in a case that V1Pos−Vthrs2≤Vcmd<V1Pos+Vthrs1; control the switching device S1Pos and the switching device S0 to be switched on alternately in a case that 0≤Vcmd<V1Pos−Vthrs2; control the switching device S0 and a switching device S1Neg to be switched on alternately in a case that −V1Neg+Vthrs3≤Vcmd<0; control the switching device S0 and a switching device S2Neg to be switched on alternately in a case that −V1Neg−Vthrs4≤Vcmd<−V1Neg+Vthrs3; and control the switching device S1Neg and the switching device S2Neg to be switched on alternately in a case that Vcmd<−V1Neg−Vthrs4.

Alternatively, another photovoltaic system is disclosed according to an embodiment of the present disclosure. The photovoltaic system includes a five-level inverter, a photovoltaic array, a filter, a transformer, two Boost circuits and a controller. The embodiment differs from the above embodiment of the photovoltaic system in that: in the embodiment, the controller is connected to the five-level inverter and configured to: acquire a voltage command value Vcmd of a phase bridge of the five-level inverter; control a switching device S2Pos and a switching device S1Pos to be switched on alternately in a case that Vcmd≥V1Pos+Vthrs1; control the switching device S2Pos and a switching device S0 to be switched on alternately in a case that V1Pos−Vthrs2≤Vcmd<V1Pos+Vthrs1; control the switching device S1Pos and the switching device S0 to be switched on alternately in a case that Vthrs5≤Vcmd<V1Pos−Vthrs2; control the switching device S1Pos and a switching device S1Neg to be switched on alternately in a case that −Vthrs6≤Vcmd<Vthrs5; control the switching device S0 and the switching device S1Neg to be switched on alternately in a case that −V1Neg+Vthrs3≤Vcmd<−Vthrs6; control the switching device S0 and a switching device S2Neg to be switched on alternately in a case that −V1Neg−Vthrs4≤Vcmd<−V1Neg+Vthrs3; and control the switching device S1Neg and the switching device S2Neg to be switched on alternately in a case that Vcmd<−V1Neg−Vthrs4.

In summary, in the embodiment, in a case that Vcmd approaches the output voltage level +V1Pos or −V1Neg, the output voltage level of the five-level inverter is switched cross levels rather than between adjacent levels, such that the duty ratio is far away from 0 or 1 rather than approaching 0 or 1, thereby preventing generating narrow pulses in a case that Vcmd approaches +V1Pos or −V1Neg. In the conventional technology, the narrow pulses are generated in a case that Vcmd approaches +V1Pos, −V1Neg or 0; and according to the present disclosure, the number of the narrow pulses generated during modulating of the five-level inverter is reduced significantly, thereby reducing the impact on the distortion of the phase bridge output voltage of the five-level inverter due to deleting of the narrow pulses, and the safety operation of the switching devices is guaranteed at the same time.

Various embodiments of the specification are described in a progressive way, each embodiment lays emphasis on the difference from other embodiments, and for the same or similar parts between various embodiments, one may refer to the description of other embodiments. For the devices provided according to the embodiments, since the devices corresponds to the method provided according to the embodiments, the description of the devices is simple, the related part may be referred to the description of the method embodiment.

According to the above illustration of the disclosed embodiments, those skilled in the art can implement or practice the present disclosure. Many changes to these embodiments are apparent for those skilled in the art, and general principles defined herein can be implemented in other embodiments without departing from the spirit or scope of the present disclosure. Hence, the present disclosure is not limited to the embodiments disclosed herein, but is to conform to the widest scope in accordance with the principles and novel features disclosed herein.

The invention claimed is:

1. A method for modulating a five-level inverter, comprising:
   acquiring a voltage command value Vcmd of a phase bridge of the five-level inverter;
   controlling a first switching device and a fourth switching device to be switched on alternately in a case that Vcmd≥V1Pos+Vthrs1;
   controlling the first switching device and a third switching device to be switched on alternately in a case that V1Pos−Vthrs2≤Vcmd<V1Pos+Vthrs1;
   controlling the fourth switching device and the third switching device to be switched on alternately in a case that 0≤Vcmd<V1Pos−Vthrs2;
   controlling the third switching device and a fifth switching device to be switched on alternately in a case that −V1Neg+Vthrs3≤Vcmd<0;
   controlling the third switching device and a second switching device to be switched on alternately in a case that −V1Neg−Vthrs4≤Vcmd<−V1Neg+Vthrs3; and
   controlling the fifth switching device and the second switching device to be switched on alternately in a case that Vcmd<−V1Neg−Vthrs4,
   wherein Vthrs1 represents a voltage value greater than or equal to Dthrs*(V2Pos−V1Pos), Vthrs2 represents a voltage value greater than or equal to Dthrs*V1Pos, Vthrs3 represents a voltage value greater than or equal to Dthrs*V1Neg, and Vthrs4 represents a voltage value greater than or equal to Dthrs*(V2Neg−V1Neg); and Dthrs indicates a duty ratio corresponding to a sum of narrow pulse time and dead-band time of the five-level inverter; and
   the five-level inverter alternately outputs five voltage levels +1, −1, +2, −2 and 0 in different combinations of switching states of the switching devices, V1Pos represents magnitude of a voltage outputted by the five-level inverter when the five-level inverter outputs the level +1, V1Neg represents magnitude of a voltage outputted by the five-level inverter when the five-level inverter outputs the level −1, V2Pos represents magnitude of a voltage outputted by the five-level inverter when the five-level inverter outputs the level +2, and V2Neg represents magnitude of a voltage outputted by the five-level inverter when the five-level inverter outputs the level −2; the level +1 is outputted when the fourth switching device is switched on; the level −1 is outputted when the fifth switching device is switched on; the level +2 is outputted when the first switching device is switched on; the level −2 is outputted when the second switching device is switched on; and the level 0 is outputted when the third switching device is switched on.

2. The method according to claim 1, wherein Vthrs1=Dthrs*(V2Pos−V1Pos), Vthrs2=Dthrs*V1Pos, Vthrs3=Dthrs*V1Neg and Vthrs4=Dthrs*(V2Neg−V1Neg).

3. A method for modulating a five-level inverter, comprising:
   acquiring a voltage command value Vcmd of a phase bridge of the five-level inverter;
   controlling a first switching device and a fourth switching device to be switched on alternately in a case that Vcmd≥V1Pos+Vthrs1;
   controlling the first switching device and a third switching device to be switched on alternately in a case that V1Pos−Vthrs2≤Vcmd<V1Pos+Vthrs1;
   controlling the fourth switching device and the third switching device to be switched on alternately in a case that Vthrs5≤Vcmd<V1Pos−Vthrs2;
   controlling the fourth switching device and a fifth switching device to be switched on alternately in a case that −Vthrs6≤Vcmd<Vthrs5;
   controlling the third switching device and the fifth switching device to be switched on alternately in a case that −V1Neg+Vthrs3≤Vcmd<−Vthrs6;
   controlling the third switching device and a second switching device to be switched on alternately in a case that −V1Neg−Vthrs4≤Vcmd<−V1Neg+Vthrs3; and
   controlling the fifth switching device and the second switching device to be switched on alternately in a case that Vcmd<−V1Neg−Vthrs4,
   wherein Vthrs1 represents a voltage value greater than or equal to Dthrs*(V2Pos−V1Pos), Vthrs2 represents a voltage value greater than or equal to Dthrs*V1Pos, Vthrs3 represents a voltage value greater than or equal to Dthrs*V1Neg, Vthrs4 represents a voltage value greater than or equal to Dthrs*(V2Neg−V1Neg), Vthrs5 represents a voltage value greater than or equal to Dthrs*V1Pos, and Vthrs6 represents a voltage value greater than or equal to Dthrs*V1Neg; and Dthrs indicates a duty ratio corresponding to a sum of narrow pulse time and dead-band time of the five-level inverter; and
   the five-level inverter alternately outputs five voltage levels +1, −1, +2, −2 and 0 in different combinations of switching states of the switching devices, V1Pos represents magnitude of a voltage outputted by the five-level inverter when the five-level inverter outputs the level +1, V1Neg represents magnitude of a voltage outputted by the five-level inverter when the five-level inverter outputs the level −1, V2Pos represents magnitude of a voltage outputted by the five-level inverter when the five-level inverter outputs the level +2, and V2Neg represents magnitude of a voltage outputted by the five-level inverter when the five-level inverter outputs the level −2; the level +1 is outputted when the fourth switching device is switched on; the level −1 is outputted when the fifth switching device is switched on; the level +2 is outputted when the first switching device is switched on; the level −2 is outputted when the second switching device is switched on; and the level 0 is outputted when the third switching device is switched on.

4. The method according to claim 3, wherein Vthrs1=Dthrs*(V2Pos−V1Pos), Vthrs2=Dthrs*V1Pos, Vthrs3=Dthrs*V1Neg, Vthrs4=Dthrs*(V2Neg−V1Neg), Vthrs5=Dthrs*V1Pos and Vthrs6=Dthrs*V1Neg.

5. A device for modulating a five-level inverter, comprising:
   an acquiring unit configured to acquire a voltage command value Vcmd of a phase bridge of the five-level inverter;
   a first processing unit configured to control a first switching device and a fourth switching device to be switched on alternately in a case that Vcmd≥V1Pos+Vthrs1;
   a second processing unit configured to control the first switching device and a third switching device to be switched on alternately in a case that V1Pos−Vthrs2≤Vcmd<V1Pos+Vthrs1;
   a third processing unit configured to control the fourth switching device and the third switching device to be switched on alternately in a case that 0≤Vcmd<V1Pos−Vthrs2;

a fourth processing unit configured to control the third switching device and a fifth switching device to be switched on alternately in a case that −V1Neg+Vthrs3≤Vcmd<0;

a fifth processing unit configured to control the third switching device and a second switching device to be switched on alternately in a case that −V1Neg−Vthrs4≤Vcmd<−V1Neg+Vthrs3; and a sixth processing unit configured to control the fifth switching device and the second switching device to be switched on alternately in a case that Vcmd<−V1Neg−Vthrs4, wherein Vthrs1 represents a voltage value greater than or equal to Dthrs*(V2Pos−V1Pos), Vthrs2 represents a voltage value greater than or equal to Dthrs*V1Pos, Vthrs3 represents a voltage value greater than or equal to Dthrs*V1Neg, and Vthrs4 represents a voltage value greater than or equal to Dthrs*(V2Neg−V1Neg); and Dthrs indicates a duty ratio corresponding to a sum of narrow pulse time and dead-band time of the five-level inverter; and the five-level inverter alternately outputs five voltage levels +1, −1, +2, −2 and 0 in different combinations of switching states of the switching devices, V1Pos represents magnitude of a voltage outputted by the five-level inverter when the five-level inverter outputs the level +1, V1Neg represents magnitude of a voltage outputted by the five-level inverter when the five-level inverter outputs the level −1, V2Pos represents magnitude of a voltage outputted by the five-level inverter when the five-level inverter outputs the level +2, and V2Neg represents magnitude of a voltage outputted by the five-level inverter when the five-level inverter outputs the level −2; the level +1 is outputted when the fourth switching device is switched on; the level −1 is outputted when the fifth switching device is switched on; the level +2 is outputted when the first switching device is switched on; the level −2 is outputted when the second switching device is switched on; and the level 0 is outputted when the third switching device is switched on.

6. The device according to claim 5, wherein Vthrs1=Dthrs*(V2Pos−V1Pos), Vthrs2=Dthrs*V1Pos, Vthrs3=Dthrs*V1Neg and Vthrs4=Dthrs*(V2Neg−V1Neg).

7. A device for modulating a five-level inverter, comprising:

an acquiring unit configured to acquire a voltage command value Vcmd of a phase bridge of the five-level inverter;

a first processing unit configured to control a first switching device and a fourth switching device to be switched on alternately in a case that Vcmd≥V1Pos+Vthrs1;

a second processing unit configured to control the first switching device and a third switching device to be switched on alternately in a case that V1Pos−Vthrs2≤Vcmd<V1Pos+Vthrs1;

a third processing unit configured to control the fourth switching device and the third switching device to be switched on alternately in a case that Vthrs5≤Vcmd<V1Pos−Vthrs2;

a fourth processing unit configured to control the fourth switching device and a fifth switching device to be switched on alternately in a case that −Vthrs6≤Vcmd<Vthrs5;

a fifth processing unit configured to control the third switching device and the fifth switching device to be switched on alternately in a case that −V1Neg+Vthrs3≤Vcmd<−Vthrs6;

a sixth processing unit configured to control the third switching device and a second switching device to be switched on alternately in a case that −V1Neg−Vthrs4≤Vcmd<−V1Neg+Vthrs3; and a seventh processing unit configured to control the fifth switching device and the second switching device to be switched on alternately in a case that Vcmd<−V1Neg−Vthrs4, wherein Vthrs1 represents a voltage value greater than or equal to Dthrs*(V2Pos−V1Pos), Vthrs2 represents a voltage value greater than or equal to Dthrs*V1Pos, Vthrs3 represents a voltage value greater than or equal to Dthrs*V1Neg, Vthrs4 represents a voltage value greater than or equal to Dthrs*(V2Neg−V1Neg), Vthrs5 represents a voltage value greater than or equal to Dthrs*V1Pos, and Vthrs6 represents a voltage value greater than or equal to Dthrs*V1Neg; and Dthrs indicates a duty ratio corresponding to a sum of narrow pulse time and dead-band time of the five-level inverter; and the five-level inverter alternately outputs five voltage levels +1, −1, +2, −2 and 0 in different combinations of switching states of the switching devices, V1Pos represents magnitude of a voltage outputted by the five-level inverter when the five-level inverter outputs the level +1, V1Neg represents magnitude of a voltage outputted by the five-level inverter when the five-level inverter outputs the level −1, V2Pos represents magnitude of a voltage outputted by the five-level inverter when the five-level inverter outputs the level +2, and V2Neg represents magnitude of a voltage outputted by the five-level inverter when the five-level inverter outputs the level −2; the level +1 is outputted when the fourth switching device is switched on; the level −1 is outputted when the fifth switching device is switched on; the level +2 is outputted when the first switching device is switched on; the level −2 is outputted when the second switching device is switched on; and the level 0 is outputted when the third switching device is switched on.

8. The device according to claim 7, wherein Vthrs1=Dthrs*(V2Pos−V1Pos), Vthrs2=Dthrs*V1Pos, Vthrs3=Dthrs*V1Neg, Vthrs4=Dthrs*(V2Neg−V1Neg), Vthrs5=Dthrs*V1Pos and Vthrs6=Dthrs*V1Neg.

9. A photovoltaic system, comprising: a photovoltaic array, two Boost circuits, a five-level inverter, a filter and a transformer, wherein a direct current side of the five-level inverter is connected to the photovoltaic array via the two Boost circuits, and a grid side of the five-level inverter is connected to a power grid via the filter and the transformer; and the photovoltaic system further comprises a controller connected to the five-level inverter, and the controller is configured to: acquire a voltage command value Vcmd of a phase bridge of the five-level inverter; control a first switching device and a fourth switching device to be switched on alternately in a case that Vcmd≥V1Pos+Vthrs1; control the first switching device and a third switching device to be switched on alternately in a case that V1Pos−Vthrs2≤Vcmd<V1Pos+Vthrs1; control the fourth switching device and the third switching device to be switched on alternately in a case that 0≤Vcmd<V1Pos−

Vthrs2; control the third switching device and a fifth switching device to be switched on alternately in a case that $-V1Neg+Vthrs3 \leq Vcmd<0$; control the third switching device and a second switching device to be switched on alternately in a case that $-V1Neg-Vthrs4 \leq Vcmd<-V1Neg+Vthrs3$; and control the fifth switching device and the second switching device to be switched on alternately in a case that $Vcmd<-V1Neg-Vthrs4$;

Vthrs1 represents a voltage value greater than or equal to $Dthrs*(V2Pos-V1Pos)$, Vthrs2 represents a voltage value greater than or equal to $Dthrs*V1Pos$, Vthrs3 represents a voltage value greater than or equal to $Dthrs*V1Neg$, and Vthrs4 represents a voltage value greater than or equal to $Dthrs*(V2Neg-V1Neg)$; and Dthrs indicates a duty ratio corresponding to a sum of narrow pulse time and dead-band time of the five-level inverter; and the five-level inverter alternately outputs five voltage levels +1, −1, +2, −2 and 0 in different combinations of switching states of the switching devices, V1Pos represents magnitude of a voltage outputted by the five-level inverter when the five-level inverter outputs the level +1, V1Neg represents magnitude of a voltage outputted by the five-level inverter when the five-level inverter outputs the level −1, V2Pos represents magnitude of a voltage outputted by the five-level inverter when the five-level inverter outputs the level +2, and V2Neg represents magnitude of a voltage outputted by the five-level inverter when the five-level inverter outputs the level −2; the level +1 is outputted when the fourth switching device is switched; the level −1 is outputted when the fifth switching device is switched on; the level +2 is outputted when the first switching device is switched on; the level −2 is outputted when the second switching device is switched on; and the level 0 is outputted when the third switching device is switched on.

10. A photovoltaic system, comprising a photovoltaic array, two Boost circuits, a five-level inverter, a filter and a transformer, wherein a direct current side of the five-level inverter is connected to the photovoltaic array via the two Boost circuits, and a grid side of the five-level inverter is connected to a power grid via the filter and the transformer; and the photovoltaic system further comprises a controller connected to the five-level inverter, and the controller is configured to: acquire a voltage command value Vcmd of a phase bridge of the five-level inverter; control a first switching device and a fourth switching device to be switched on alternately in a case that $Vcmd \geq V1Pos+Vthrs1$; control the first switching device and a third switching device to be switched on alternately in a case that $V1Pos-Vthrs2 \leq Vcmd<V1Pos+Vthrs1$; control the fourth switching device and the third switching device to be switched on alternately in a case that $Vthrs5 \leq Vcmd<V1Pos-Vthrs2$; control the fourth switching device and a fifth switching device to be switched on alternately in a case that $-Vthrs6 \leq Vcmd<Vthrs5$; control the third switching device and the fifth switching device to be switched on alternately in a case that $-V1Neg+Vthrs3 \leq Vcmd<-Vthrs6$; control the third switching device and a second switching device to be switched on alternately in a case that $-V1Neg-Vthrs4 \leq Vcmd<-V1Neg+Vthrs3$; and control the fifth switching device and the second switching device to be switched on alternately in a case that $Vcmd<-V1Neg-Vthrs4$;

Vthrs1 represents a voltage value greater than or equal to $Dthrs*(V2Pos-V1Pos)$, Vthrs2 represents a voltage value greater than or equal to $Dthrs*V1Pos$, Vthrs3 represents a voltage value greater than or equal to $Dthrs*V1Neg$, Vthrs4 represents a voltage value greater than or equal to $Dthrs*(V2Neg-V1Neg)$, Vthrs5 represents a voltage value greater than or equal to $Dthrs*V1Pos$, and Vthrs6 represents a voltage value greater than or equal to $Dthrs*V1Neg$; and Dthrs indicates a duty ratio corresponding to a sum of narrow pulse time and dead-band time of the five-level inverter; and the five-level inverter alternately outputs five voltage levels +1, −1, +2, −2 and 0 in different combinations of switching states of the switching devices, V1Pos represents magnitude of a voltage outputted by the five-level inverter when the five-level inverter outputs the level +1, V1Neg represents magnitude of a voltage outputted by the five-level inverter when the five-level inverter outputs the level −1, V2Pos represents magnitude of a voltage outputted by the five-level inverter when the five-level inverter outputs the level +2, and V2Neg represents magnitude of a voltage outputted by the five-level inverter when the five-level inverter outputs the level −2; the level +1 is outputted when the fourth switching device is switched on; the level −1 is outputted when the fifth switching device is switched on; the level +2 is outputted when the first switching device is switched on; the level −2 is outputted when the second switching device is switched on; and the level 0 is outputted when the third switching device is switched on.

* * * * *